(12) United States Patent
Ishiguro et al.

(10) Patent No.: US 9,184,458 B2
(45) Date of Patent: Nov. 10, 2015

(54) DEVICE AND METHOD FOR PROCESSING EXHAUST GAS FROM FUEL CELL

(75) Inventors: Fumihiko Ishiguro, Kariya (JP); Hirohisa Kato, Kariya (JP); Kazuo Ishikawa, Kariya (JP); Hideyuki Tanaka, Kariya (JP); Toru Bisaka, Kariya (JP); Tomohiro Yamagami, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 1716 days.

(21) Appl. No.: 12/529,172

(22) PCT Filed: Apr. 22, 2008

(86) PCT No.: PCT/JP2008/057758
§ 371 (c)(1),
(2), (4) Date: Aug. 28, 2009

(87) PCT Pub. No.: WO2008/133249
PCT Pub. Date: Nov. 6, 2008

(65) Prior Publication Data
US 2010/0092812 A1    Apr. 15, 2010

(30) Foreign Application Priority Data
Apr. 25, 2007 (JP) ................ 2007-115623

(51) Int. Cl.
*H01M 8/06* (2006.01)
*H01M 8/10* (2006.01)

(52) U.S. Cl.
CPC ..... *H01M 8/0662* (2013.01); *B01D 2258/0208* (2013.01); *H01M 2008/1095* (2013.01); *Y02E 60/50* (2013.01)

(58) Field of Classification Search
CPC ................ B01D 2258/0208; H01M 8/0662
USPC ......... 429/400, 408, 415, 417, 428, 443–444, 429/535
See application file for complete search history.

(56) References Cited

U.S. PATENT DOCUMENTS

| | | | |
|---|---|---|---|
| 2003/0077488 A1 | 4/2003 | Yamamoto et al. | |
| 2005/0118471 A1 | 6/2005 | Fukuma et al. | |
| 2006/0254906 A1 | 11/2006 | Numata et al. | |

FOREIGN PATENT DOCUMENTS

| | | |
|---|---|---|
| JP | 2004-127666 A | 4/2004 |
| JP | 2004-139815 A | 5/2004 |

(Continued)

OTHER PUBLICATIONS

Machine Translation in English of JP 2006244799.*

(Continued)

*Primary Examiner* — Maria J Laios

(57) ABSTRACT

An exhaust gas processing device (16) intermittently introduces anode off-gas from a fuel cell (12). The exhaust processing device (16) discharges the anode off-gas after diluting it with dilution gas. The exhaust gas processing device (16) includes a dilution container (25) and a partition plate (28), which divide the interior of the dilution container (25) into a first chamber (26) and a second chamber (27). The partition plate (28) has a clearance (29), which connects the first chamber (26) and the second chamber (27) to each other. The exhaust gas processing device (16) includes a discharge portion (32) provided in the first chamber (26), a dilution gas inlet portion (30) provided in the first chamber (26), and an anode off-gas inlet portion (31) provided in the second chamber (27).

6 Claims, 8 Drawing Sheets

(56) References Cited

FOREIGN PATENT DOCUMENTS

| JP | 2006-031998 A | 2/2006 |
|---|---|---|
| JP | 2006-244799 A | 9/2006 |
| JP | 2006-318821 A | 11/2006 |
| JP | 2006-344470 A | 12/2006 |
| JP | 2006-351520 A | 12/2006 |
| JP | 2007-018816 A | 1/2007 |
| JP | 2007-179894 A | 7/2007 |
| JP | 2007-324014 A | 12/2007 |

OTHER PUBLICATIONS

Office Action for corresponding Canadian Application No. 2,678,844, dated Jan. 24, 2011.
International Preliminary Report on Patentability for the corresponding PCT Application No. PCT/JP2008/057758.
International Search Report issued on Aug. 12, 2008, for international application No. PCT/JP2008/057758.

* cited by examiner

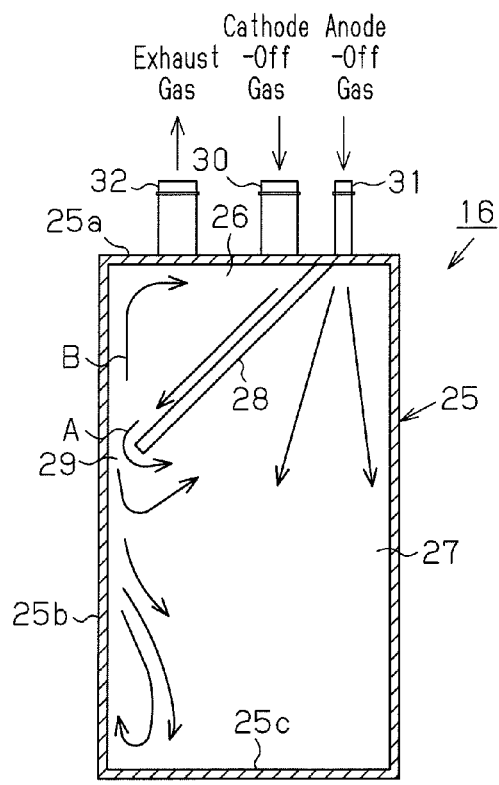
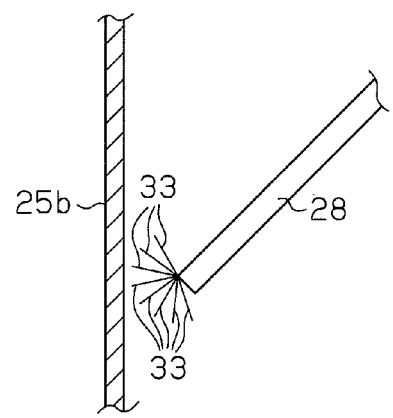
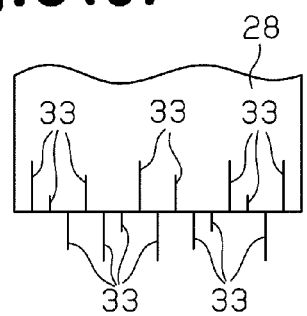
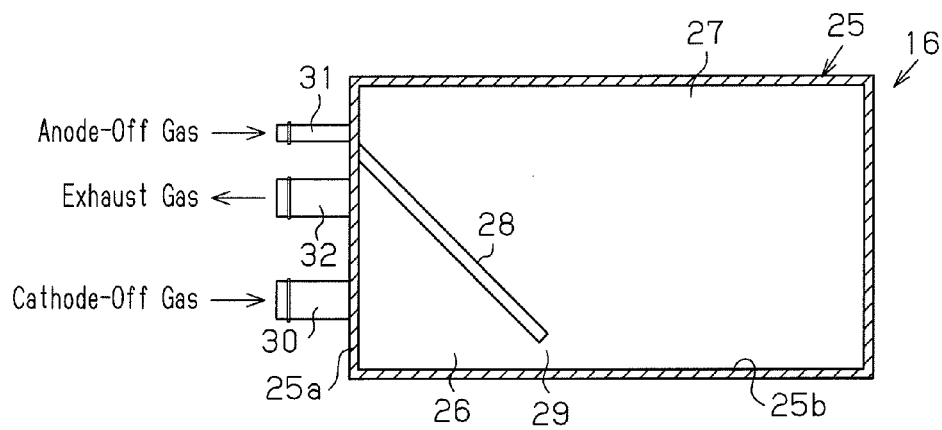

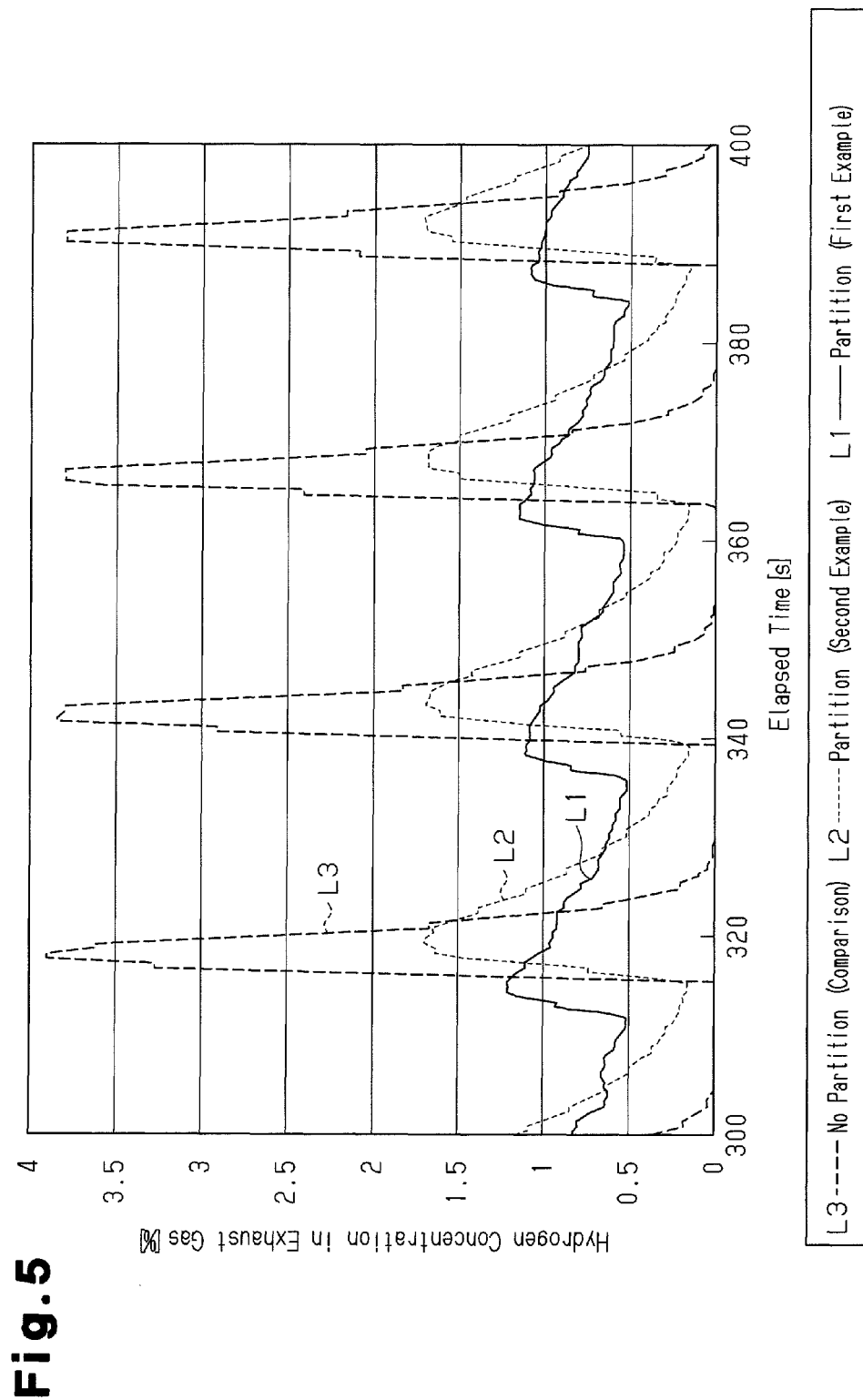

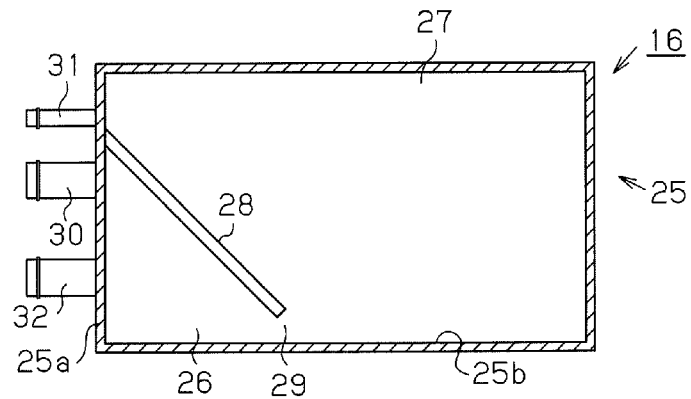
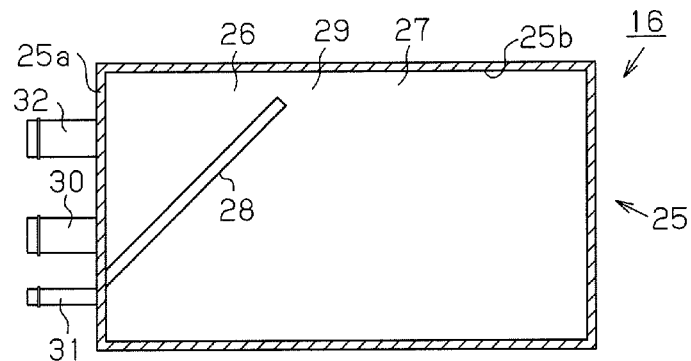
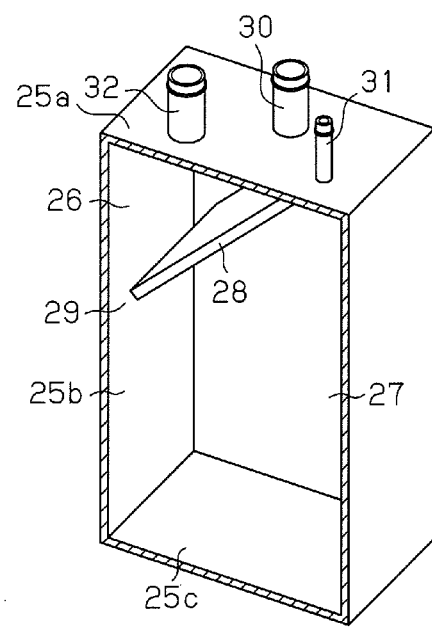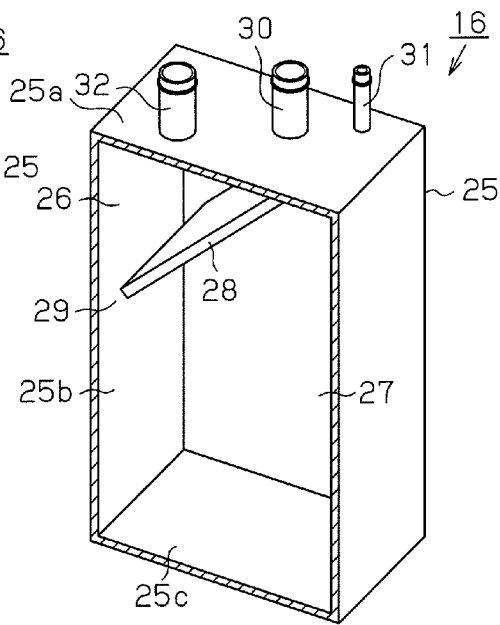

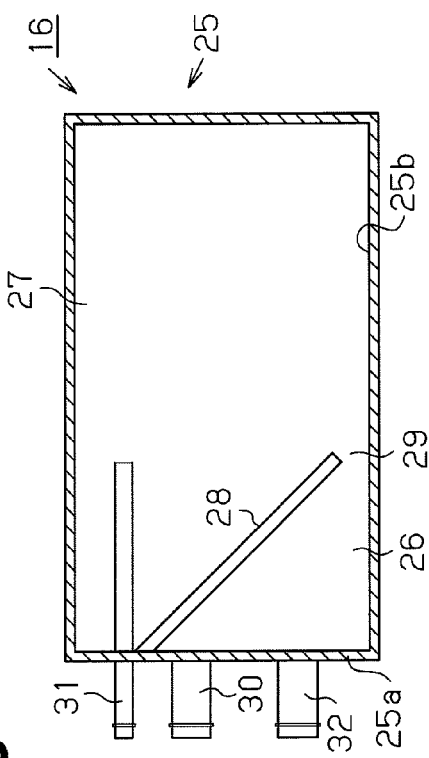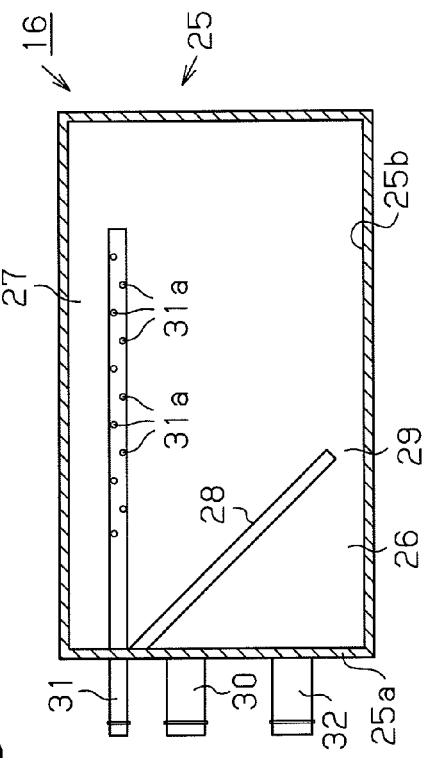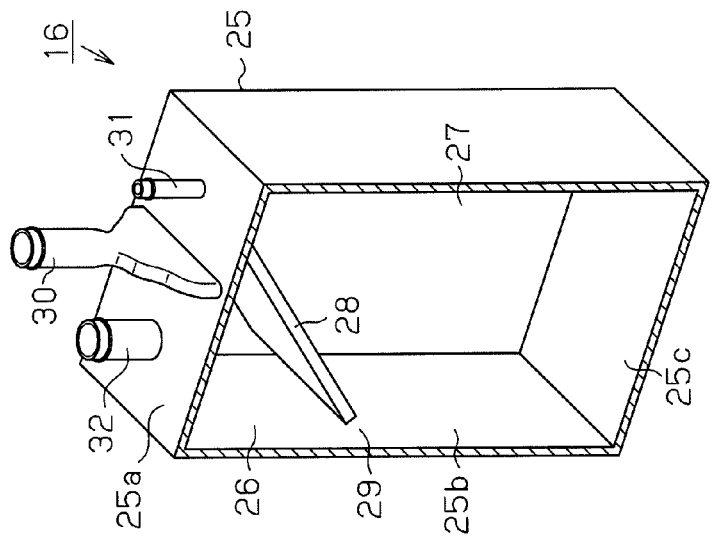

DEVICE AND METHOD FOR PROCESSING EXHAUST GAS FROM FUEL CELL

FIELD OF THE INVENTION

The present invention relates to a device for processing exhaust gas from a fuel cell. The exhaust gas processing device processes exhaust gas from a fuel cell such that the hydrogen concentration in the exhaust gas becomes less than or equal to a reference value. The present invention also relates to a method for processing exhaust gas from a fuel cell.

BACKGROUND OF THE INVENTION

Fuel cells have recently been drawing attention as power sources that restrain global warming caused by exhaust gas, and some types of fuel cells have been put to practical use. A fuel cell generates electric energy by reacting hydrogen with oxygen. Instead of directly using oxygen as a cathode, a typical fuel cell system supplies air to a cathode to use oxygen in the air. Some of the water and nitrogen generated at the cathode move from the cathode to the anode by passing through an electrolyte membrane. That is, reverse diffusion occurs. Thus, if the fuel cell continues operating, the concentration of water and nitrogen at the anode increases. When the concentration of water and nitrogen at the anode surpasses a certain level, the power generation efficiency of the fuel cell is reduced. To prevent or restrain this, an anode purge is typically executed for discharging water and nitrogen that has accumulated in the anode. If anode off-gas is directly released to the atmosphere when performing the anode purge, the hydrogen concentration in the exhaust gas is too high. Patent Document 1 and Patent Document 2 each disclose an exhaust gas processing device that dilutes anode off-gas with cathode off-gas before discharging, so as to lower the hydrogen gas concentration in the exhaust gas.

FIG. 15 illustrates the exhaust gas processing device disclosed in Patent Document 1. The exhaust gas processing device of FIG. 15 includes a dilution container 51, an anode off-gas inlet passage 52, a dilution gas passage 57, a dilution gas release hole 58, a gas mixture discharge hole 59, a partition plate 53, and a communication gas passage 56. The axis of the dilution container 51 extends substantially horizontally. The anode off-gas inlet passage 52 has an anode off-gas release hole 52a for releasing anode off-gas into the dilution container 51. The dilution gas passage 57, through which dilution gas flows, extends through the dilution container 51 along the bottom. The dilution gas release hole 58 releases dilution gas that has flowed through the dilution gas passage 57 into the dilution container 51. The gas mixture discharge hole 59 causes the dilution gas passage 57 to discharge gas mixture, which is formed by mixing anode off-gas and dilution gas in the dilution container 51. The partition plate 53 is arranged to be substantially vertical in the dilution container 51, so as to divide the interior of the dilution container 51 into an upstream chamber 54 and a downstream chamber 55. The communication gas passage 56 connects the upstream chamber 54 to the downstream chamber 55. The anode off-gas release hole 52a is formed to release anode off-gas toward the partition plate 53.

FIG. 16 illustrates the exhaust gas processing device disclosed in Patent Document 2. The exhaust gas processing device of FIG. 16 includes a hydrogen inlet port 60, a retention container 61, a hydrogen discharge port 62, a dry air inlet portion 63, a first blocking body 64, a second blocking body 65, a coupling arm 66, an anode off-gas pipe 67, an urging weight 68, and a dilution gas pipe 69. The retention container 61 has a retention chamber 61a. The hydrogen inlet port 60 of the anode off-gas pipe 67 introduces anode off-gas containing hydrogen discharged from the anode of a fuel cell into the retention chamber 61a, so that the gas stays in the retention chamber 61a. Hydrogen retained in the retention chamber 61a is discharged to the dilution gas pipe 69 through the hydrogen discharge port 62, and diluted with cathode off-gas, serving as dilution gas. The hydrogen is then discharged to the outside. Unless anode off-gas is introduced through the hydrogen inlet port 60 into the retention chamber 61a, dry air is introduced into the retention chamber 61a through the dry air inlet portion 63.

The first blocking body 64 limits the introduction of hydrogen through the hydrogen inlet port 60 into the retention chamber 61a. The second blocking body 65 restricts discharge of hydrogen through the retention chamber 61a through the hydrogen discharge port 62. When hydrogen is introduced through the hydrogen inlet port 60 to the retention chamber 61a, the coupling arm 66 causes the first blocking body 64 to operate together with the second blocking body 65, so that hydrogen in the retention chamber 61a is not discharged through the hydrogen discharge port 62. A center portion of the coupling arm 66 is pivotably supported by the dilution gas pipe 69 with a shaft member 66c and a base 66d. The coupling arm 66 has a slightly widened L-shape when viewed from the side. That is, the coupling arm 66 includes a first arm 66a on the upstream side of the flow of hydrogen and a second arm 66b on the downstream side.

The angle between the first arm 66a and the second arm 66b is set to such an angle that the second blocking body 65 opens the hydrogen discharge port 62 when the first blocking body 64 closes the hydrogen inlet port 60, and that the second blocking body 65 closes the hydrogen discharge port 62 when the first blocking body 64 opens the hydrogen inlet port 60. The urging weight 68 is fixed to an upstream end of the first arm 66a. The own weight of the urging weight 68 urges the first blocking body 64 to close the hydrogen inlet port 60 via the first arm 66a. The mass (weight) of the urging weight 68 is set such that, during hydrogen purging, hydrogen that has reached the upstream surface of the first blocking body 64 through the anode off-gas pipe 67 pushes the first blocking body 64 toward the retention chamber 61a, so as to allow the hydrogen inlet port 60 to be opened.

When anode off-gas is introduced into the retention chamber 61a of the exhaust gas processing device of FIG. 16, the second blocking body 65 closes the hydrogen discharge port 62. When the second blocking body 65 is arranged at the open position to discharge anode off-gas in the retention chamber 61a to the hydrogen discharge port 62, the first blocking body 64 closes the hydrogen inlet port 60. Therefore, high concentration of hydrogen is prevented from being discharged during the anode purge. However, the exhaust gas processing device of FIG. 16 has a complicated structure. Further, the maintenance for allowing the first blocking body 64 and the second blocking body 65 to move smoothly, or rotate smoothly, is troublesome.

Unlike the exhaust gas processing device of FIG. 16, the exhaust gas processing device of FIG. 15 requires no structure for preventing anode off-gas from being introduced into the upstream chamber 54, and no structure for preventing gas from being released through the dilution gas release hole 58. However, in the structure shown in FIG. 15, the dilution gas release hole 58, which introduces dilution gas into the upstream chamber 54, and the gas mixture discharge hole 59, which discharges diluted anode off-gas from the downstream chamber 55, are holes formed in the single dilution gas passage 57. Therefore, it is difficult to properly adjust the amount of dilution gas introduced into the upstream chamber 54 and the amount of gas discharged from the downstream chamber 55. Anode off-gas and dilution gas are introduced into the upstream chamber 54, which is defined by the partition plate 53. Thus, anode off-gas during anode purge can be moved along the flow of dilution gas introduced into the upstream chamber 54. That is, a high proportion of the anode off-gas is insufficiently diffused in the upstream chamber 54, moved to the downstream chamber 55 with dilution gas, and discharged through the gas mixture discharge hole 59. In other words, the hydrogen concentration can be temporarily raised during the anode purge.

Patent Document 1: Japanese Laid-Open Patent Publication No. 2006-31998

Patent Document 2: Japanese Laid-Open Patent Publication No. 2006-344470

SUMMARY OF THE INVENTION

Accordingly, it is an objective of the present invention to provide a device for processing exhaust gas from a fuel cell that lowers the peak hydrogen concentration in exhaust gas with a simple structure. The present invention also provides a method for processing exhaust gas from a fuel cell.

In accordance with one aspect of the present invention, a device for processing exhaust gas from a fuel cell is provided. The exhaust gas processing device intermittently introduces anode off-gas from the fuel cell. The exhaust processing device discharges the anode off-gas after diluting it with dilution gas. The exhaust gas processing device includes a dilution container and a partition plate, which divide the interior of the dilution container into a first chamber and a second chamber. The partition plate has a clearance, which connects the first chamber and the second chamber to each other. The exhaust gas processing device includes a discharge portion provided in the first chamber, a dilution gas inlet portion provided in the first chamber, and an anode off-gas inlet portion provided in the second chamber.

In accordance with another aspect of the present invention, a method for processing exhaust gas from a fuel cell is provided. The exhaust gas processing method includes preparing a dilution container. The dilution container has a first chamber and a second chamber, which are separated from each other by a partition plate. A discharge portion and a cathode off-gas inlet portion are provided in the first chamber. An anode off-gas inlet portion is proved in the second chamber. A clearance, which connects the first chamber and the second chamber to each other, is provided at the distal end of the partition plate. The cathode off-gas inlet portion is located at a portion that is closer to the proximal end of the partition plate. Cathode off-gas is introduced through the cathode off-gas inlet portion to the first chamber such that a part of the flow of the cathode off-gas in the vicinity of the clearance becomes a flow toward the discharge portion, and that another part of the cathode off-gas repeatedly enters and exits the second chamber in the vicinity of the clearance. Anode off-gas from the fuel cell is intermittently introduced into the second chamber through the anode off-gas inlet portion. The anode off-gas is introduced into the second chamber while being directed away from the clearance, and is expanded and diffused in the second chamber. By the flow of the cathode off-gas that repeatedly enters and exits the second chamber, the expanded and diffused anode off-gas is moved from the second chamber to the first chamber, and is diluted. The anode off-gas is then discharged through the discharge portion.

BRIEF DESCRIPTION OF THE DRAWINGS

FIG. 3(a) is a schematic cross-sectional view showing the exhaust gas processing device shown in FIG. 2(a);

FIG. 3(b) is an enlarged diagram showing a state of threads when the flow of cathode off-gas in the vicinity of the clearance in FIG. 3(a) is observed through the tuft method;

FIG. 3(c) is a plan view of FIG. 3(b);

FIG. 4 is a cross-sectional side view illustrating an exhaust gas processing device according to a second example of the present invention;

FIG. 5 is a graph showing the relationship between the elapsed time and the hydrogen concentration in exhaust gas in the exhaust gas processing device of FIG. 2(a) and in the exhaust gas processing device of FIG. 4;

FIGS. 6(a) and 6(b) are cross-sectional side views each illustrating a modification in which the exhaust gas processing device of FIG. 2(a) is arranged horizontally;

FIGS. 7(a) and 7(b) are schematic perspective views each showing a modification in which the arrangement of the cathode off-gas inlet portion, the anode off-gas inlet portion, and the discharge portion is changed;

FIGS. 10(a) and 10(b) are cross-sectional side views each showing an anode off-gas inlet portion of a modification;

FIG. 11 is a schematic perspective view showing a cathode off-gas inlet portion of a modification;

DETAILED DESCRIPTION OF THE PREFERRED EMBODIMENTS

FIGS. 1 to 5 show an exhaust gas processing device 16 according to one embodiment of the present invention.

Figure 1:
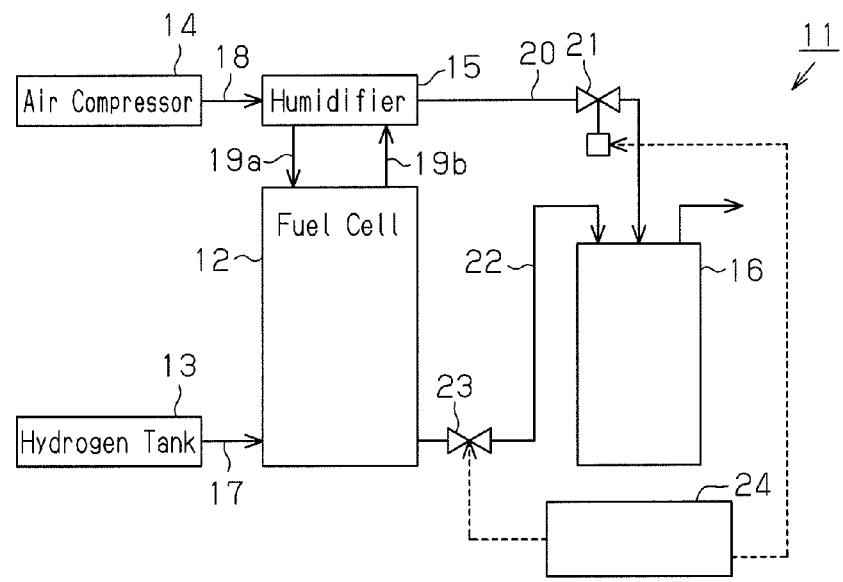
FIG. 1 is a block diagram showing a fuel cell system having an exhaust gas processing device of FIG. 2.

As shown in FIG. 1, a fuel cell system 11 includes a fuel cell 12, a hydrogen tank 13, a compressor 14 serving as a pressurizing device, a humidifier 15, and an exhaust gas processing device 16.

The fuel cell 12 is, for example, a polymer electrolyte membrane fuel cell. The fuel cell 12 causes hydrogen supplied from the hydrogen tank 13 to react with oxygen in air supplied from the compressor 14, thereby generating direct current electric energy, or a direct current electricity.

The hydrogen tank 13 is connected to a hydrogen supply port (not shown) of the fuel cell 12 by a conduit 17. A regulator (not shown) that regulates the pressure of hydrogen supplied to the fuel cell 12 is provided in the conduit 17. The regulator is a pressure control valve that depressurizes hydrogen that is stored at a high pressure in the hydrogen tank 13 to a predetermined pressure, and supplies the hydrogen under a constant pressure.

The compressor 14 is connected to the humidifier 15 by a conduit 18. The humidifier 15 is connected to an oxygen supply port (not shown) of the fuel cell 12 by a supply pipe 19a. Further, the humidifier 15 is connected to an off-gas discharge port (not shown) by a conduit 19b. Air that has been pressurized by the compressor 14 is humidified by the humidifier 15 and then supplied to the to the oxygen supply port of the fuel cell 12. Off-gas from the cathode (not shown) of the fuel cell 12 is discharged to the humidifier 15 through the conduit 19b.

A first end of a cathode off-gas discharge pipe 20 is connected to the humidifier 15, and a second end of the cathode off-gas discharge pipe 20 is connected to the exhaust gas processing device 16. The cathode off-gas discharge pipe 20 conducts, as dilution gas, cathode off-gas from the fuel cell 12 to the exhaust gas processing device 16. A pressure regulating valve 21 is provided in the cathode off-gas discharge pipe 20.

A first end of a purge gas pipe 22 is connected to a hydrogen discharge port (not shown) of the fuel cell 12, and a second end of the purge gas pipe 22 is connected to the exhaust gas processing device 16. A purge on-off valve 23 serving as an anode purge valve is located in the purge gas pipe 22.

The pressure regulating valve 21 and the purge on-off valve 23 are electrically connected to a controller 24 serving as a control section. The controller 24 adjusts the opening degree of the pressure regulating valve 21 and controls the opening state of the purge on-off valve 23.

Figure 2A:
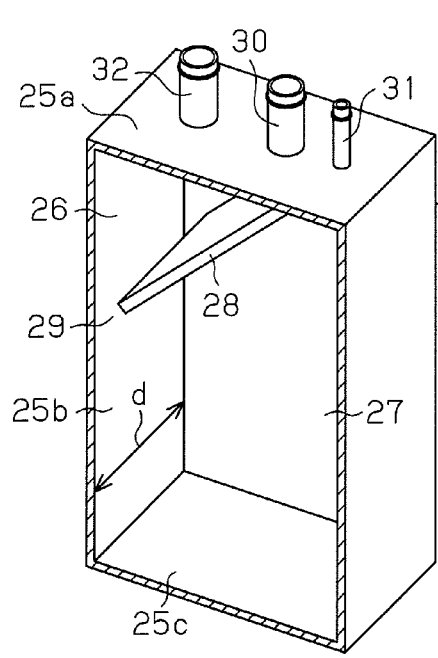
FIG. 2(a) is a schematic perspective view showing an exhaust gas processing device according to a first example of one embodiment of the present invention.
Figure 2B:
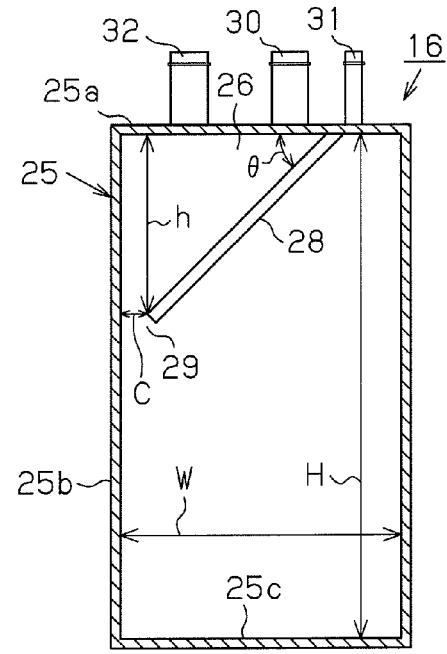
FIG. 2(b) is a cross-sectional view of the exhaust gas processing device shown in FIG. 2(a)

FIGS. 2(a) and 2(b) illustrate the exhaust gas processing device 16. The exhaust gas processing device 16 includes a dilution container 25, which is formed as a vertically long rectangular parallelepiped. The dilution container 25 has a partition plate 28. The partition plate 28 divides the interior of the dilution container 25 into a first chamber 26, into which cathode off-gas is introduced, and a second chamber 27, in to which anode-off gas is introduced. The partition plate 28 of this example serves as a partitioning portion and a dilution gas conducting portion. The proximal end of the partition plate 28 is fixed to a top plate 25a of the dilution container 25. A clearance 29 is defined between a distal end of the partition plate 28, which is an end of the partition plate 28, and a wall surface 25b of the dilution container 25. The clearance 29 functions as a communication portion that connects the first chamber 26 and the second chamber 27 to each other. The clearance 29 is formed like a slit. The longitudinal direction of the clearance, that is, the longitudinal direction of the slit, is perpendicular to the direction in which dilution gas flows. The partition plate 28 is inclined such that the closer to the distal end of the partition plate 28, the farther away it becomes from the direction in which anode off-gas is introduced into the second chamber 27. The partition plate 28 is arranged such that the angle θ defined by the partition plate 28 and the top plate 25a is in the range of 45°±20°. That is, the partition plate 28 is arranged to be inclined toward the direction in which cathode off-gas is introduced.

As shown in FIGS. 2(a) and 2(b), a cathode off-gas inlet portion 30, an anode off-gas inlet portion 31, and a discharge portion 32 are provided on the top plate 25a. The cathode off-gas inlet portion 30 functions as a diluting gas inlet portion that introduces dilution gas, which is cathode off-gas, into the first chamber 26. The anode off-gas inlet portion 31 introduces anode off-gas into the second chamber 27. The discharge portion 32 discharges cathode off-gas and anode off-gas, which have been introduced into the dilution container 25, from the first chamber 26. Cathode off-gas flows through the first chamber 26 without exception and is temporarily expanded before being discharged. The cathode off-gas inlet portion 30, the anode off-gas inlet portion 31, and the discharge portion 32 are all formed by a pipe. The cathode off-gas inlet portion 30 and the discharge portion 32 are formed of pipes having the same diameter. The anode off-gas inlet portion 31 is formed by a pipe having a smaller diameter than that of the cathode off-gas inlet portion 30. In the present embodiment, each pipe is fixed to top plate 25a so as to extend perpendicular to the top plate 25a. The anode off-gas inlet portion 31 and the cathode off-gas inlet portion 30 are arranged such that the direction in which anode off-gas is introduced is the same as the direction in which cathode off-gas is introduced. The partition plate 28 is arranged to be inclined from its proximal end in a direction away through the anode off-gas inlet portion 31, that is, to be inclined leftward as viewed in FIG. 2(b). That is, the clearance 29 is formed at a portion of the partition plate 28 that is farthest through the anode off-gas inlet portion 31. The cathode off-gas inlet portion 30 is connected to the second end of the cathode off-gas discharge pipe 20. The anode off-gas inlet portion 31 is connected to the second end of the purge gas pipe 22. The discharge portion 32 is connected to a muffler (not shown).

The cathode off-gas inlet portion 30 is arranged such that cathode off-gas introduced into the first chamber 26 flows toward the clearance 29, and that the flow at the clearance 29 spreads over the entire clearance 29 except when anode purge is performed. The cathode off-gas inlet portion 30 of the present embodiment is located in the vicinity of the proximal end of the partition plate 28. The cathode off-gas inlet portion 30 is located at a center portion of the top plate 25a in the direction of the depth, or in a center portion in a direction perpendicular to the elevation of FIG. 2(b). Further, the cathode off-gas inlet portion 30 is arranged such that the flow of cathode off-gas that is introduced into the first chamber 26 impinges on the partition plate 28 and is thus spread in the widthwise direction of the partition plate 28, or in the direction of the depth of the dilution container 25. That is, the flow of cathode off-gas introduced into the first chamber 26 impinges on the partition plate 28 so as to be spread in directions that are perpendicular to the introducing direction of the cathode gas and parallel with the partition plate 28.

The anode off-gas inlet portion 31 is in the vicinity of the partition plate 28 and located at a center portion in a direction of the depth of the top plate 25a. The anode off-gas inlet portion 31 is arranged such that anode off-gas introduced into the second chamber 27 is directed away from the clearance 29.

On the top plate 25a, the discharge portion 32 is located at a position away from the cathode off-gas inlet portion 30. The discharge portion 32 is located in a center portion in the direction of the depth of the top plate 25a.

An operation of the fuel cell system 11 will now be described.

When the fuel cell 12 is operating, hydrogen in the hydrogen tank 13 in a predetermined pressurized state is supplied to a hydrogen electrode, which serves as the anode of the fuel cell 12. Also, when the compressor 14 is operated, air is pressurized to a predetermined pressure and supplied to an air electrode, which is the cathode of the fuel cell 12. The hydrogen supplied to the anode is dissociated into hydrogen ions and electrons. The hydrogen ions moved to the cathode together with water through an electrolyte membrane. Oxygen in the air supplied to the cathode is bound to hydrogen ions that have reached the cathode after moving through the electrolyte membrane, and to electrons that have passed through an external circuit, so that water is generated at the cathode. The water generated at the cathode the state of vapor is discharged as cathode off-gas to the humidifier 15 together with unreacted air. The cathode off-gas is discharged to the atmosphere through the exhaust gas processing device 16.

Some of the water and nitrogen at the cathode move from the cathode to the anode by passing through the electrolyte membrane. That is, reverse diffusion occurs. Thus, if the fuel cell 12 continues operating, the concentration of water and nitrogen at the anode increases. When the concentration of water and nitrogen surpasses a certain level, the power generation efficiency of the fuel cell 12 is reduced. To prevent or restrain this, the purge on-off valve 23 is opened, for example, when the fuel cell 12 has operated for a predetermined period. That is, anode purge is performed in which water and nitrogen accumulated in the anode is discharged to the purge gas pipe 22 together with hydrogen gas. Anode off-gas, which has been discharged as purge gas to the purge gas pipe 22 by the anode purge is introduced to the exhaust gas processing device 16 through the purge gas pipe 22. The anode off-gas is discharged to the atmosphere through a muffler (not shown) after being diluted with the cathode off-gas in the exhaust gas processing device 16.

A single open time of the purge on-off valve 23 is short 0.1 seconds. The interval of the opening of the purge on-off valve 23, that is, the purge interval, is set in advance based on the operating time of the fuel cell 12, that is, based on the amount of power generation of the fuel cell 12. For example, the interval is set to twenty to thirty seconds.

The fuel cell 12 is connected to a load (not shown). The fuel cell 12 is operated such that the pressure of the hydrogen supplied to the anode is constant, and the amount of air supplied to the cathode can be varied in accordance with the demand of the load. When the load connected to the fuel cell 12 demands a high load, the fuel cell 12 is operated at a high power, and when the load demand is low, the fuel cell 12 is operated at a low power. When the fuel cell 12 is operated at a high power, a great amount of air is supplied to the cathode. Thus, when the demand of the load connected to the fuel cell 12 is high, the hydrogen concentration in the exhaust gas is lowered to or below a reference value by simply diluting anode off-gas with cathode off-gas and discharging it. On the other hand, when the demand of the load connected to the fuel cell 12 is low, the fuel cell 12 is operated at a low power. Thus, the amount of cathode off-gas is relatively reduced. Suppose a typical exhaust gas processing device dilutes anode off-gas with cathode off-gas, the amount of the cathode off gas may be insufficient for diluting the anode off-gas to lower the hydrogen concentration in exhaust gas in a low load state.

However, the exhaust gas processing device 16 of the present embodiment discharges anode off-gas through the discharge portion 32 after diluting the anode off-gas with cathode off-gas in the manner shown below. Thus, even if the amount of cathode off-gas discharged from the humidifier 15 is small, that is, even if the amount of cathode off-gas introduced into the exhaust gas processing device 16 from the humidifier 15 is small, the exhaust gas processing device 16 dilutes the anode off-gas such that the hydrogen concentration in the exhaust gas is lowered to or below the reference value.

As shown in FIG. 3(a), cathode off-gas that has been introduced into the first chamber 26 through the cathode off-gas inlet portion 30 impinges on and spreads on the partition plate 28, and then moves toward the distal end of the partition plate 28. In the vicinity of the clearance 29, the flow of cathode off-gas is divided into a flow toward the second chamber 27 shown by arrow A and a flow toward the discharge portion 32 shown by arrow B. The wall surface 25b functions as a flow dividing portion. Part of the flow of cathode off gas toward the second chamber 27 enters the second chamber 27 after flowing around the distal end of the partition plate 28. Further, a part of the flow of cathode off-gas that has entered the second chamber 27 changes its direction at a position away from the distal end of the partition plate 28, and returns to the first chamber 26 through the clearance 29. That is, when a flow of cathode off-gas from the first chamber 26 to the second chamber 27 is generated, a flow from the second chamber 27 to the first chamber 26 is also generated. Therefore, when the anode purge is not being performed, that is, when no anode off-gas is introduced into the second chamber 27, back-and-forth flow between the first chamber 26 and the second chamber 27 is produced at the clearance 29.

The flow of cathode off-gas at the clearance 29 preferably spreads over the entire clearance 29. The flow of cathode off-gas at the clearance 29 can be observed using, for example, the tuft method. That is, the front side of the dilution container 25 is made transparent, and a number of threads are bonded to the distal end of the partition plate 28. The behavior of the threads at the distal end of the partition plate 28 is observed. As shown in FIGS. 3(b) and 3(c), the threads 33 are directed in different directions at a given moment. However, a continuous observation reveals that each thread vibrates to both sides of a certain angle. That is, each thread 33 is vibrated to swing to both sides of a certain direction. However, "a state in which cathode off-gas flows while spreading over the entire clearance 29" is not limited to a state that can be observed through the tuft method.

That is, "a state in which cathode off-gas flows while spreading over the entire clearance 29" is a condition in which the state of flow of cathode off-gas varies along direction of the depth of the clearance 29, but back-and-forth flow between the first chamber 26 and the second chamber 27 exists when viewed as a whole. In other words, flow from the first chamber 26 to the second chamber 27 and flow from the second chamber 27 to the first chamber 26 occur over the entire clearance 29 in a direction perpendicular to the elevation of FIG. 3(a).

In other words, cathode off-gas flows toward the slit-like clearance 29 while spreading over the entire length of the slit. If cathode off-gas is insufficiently spread in the longitudinal direction of the clearance 29, a flow from the first chamber 26 to the second chamber 27 is generated in a portion where the flow of cathode off-gas is strong, for example, in a center portion with respect to the direction of the depth of the clearance 29. At each end in the direction of the depth, where the flow of cathode off-gas is weak, a flow from the second chamber 27 to the first chamber 26 is generated. In this case, the flow of cathode off-gas does not spread beyond the size of the slit in the longitudinal direction.

On the other hand, anode off-gas that is introduced through the anode off-gas inlet portion 31 to the second chamber 27 advances toward a bottom wall 25c, while expanding and being diffused. The direction of the flow of the anode off-gas is changed by the bottom wall 25c, so that the flow is diffused (spreads) over the entire second chamber 27. After reaching a back-and-forth flow between the first chamber 26 and the second chamber 27, anode off-gas is moved to the first chamber 26 by the back-and-forth flow, and discharged through the discharge portion 32 together with the flow toward the discharge portion 32. The flow of cathode off-gas at the clearance 29 prevents the flow from the second chamber 27 to the first chamber 26 from being suddenly changed, and prevents anode off-gas from flowing into the first chamber 26 before being diffused in the anode purge. That is, a phenomenon does not occur in which anode off-gas introduced through the anode off-gas inlet portion 31 to the second chamber 27 advances toward the clearance 29 without being diffused, proceeds to the first chamber 26 through the clearance 29, and is then discharged through the discharge portion 32. Therefore, the anode purge gas introduced into the exhaust gas processing device 16 is diluted so that the hydrogen concentration in the exhaust gas falls to or below the reference value, even if the amount of cathode off-gas discharged from the humidifier 15 is small.

Exhaust gas processing devices 16 according to a first example and a second example were installed in a fuel cell system 11, and the hydrogen concentration in exhaust gas discharged through the discharge portion 32 was measured. The measured results are shown in FIG. 5, together with a comparison example. In the second example, except for the period of the anode purge, the flow of cathode off-gas did not spread over the entire clearance 29. No partition plate 28 was provided in the comparison example. In FIG. 5, solid line L1 shows the first example, dotted line L2 shows the second example, and broken line L3 shows the example.

FIG. 4 shows an exhaust gas processing device 16 of the second example. The second example is different from the first example in that the positions of the cathode off-gas inlet portion 30 and the discharge portion 32 are counterchanged. That is, the discharge portion 32 of the second example is located in the vicinity of the partition plate 28. The cathode off-gas inlet portion 30 is located at a position on the top plate 25a that corresponded to the distal end of the partition plate 28. In the case of FIG. 4, cathode off-gas is introduced into the second chamber 27 through the cathode off-gas inlet portion 30 and impinges on the partition plate 28. The distance traveled by the cathode gas after impinging on the partition plate 28 until it reaches the clearance 29 is short. Therefore, the flow of cathode off-gas of the second example reaches the clearance 29 before sufficiently spreading in the direction of depth of the dilution container 25. Thus, a flow from the first chamber 26 to the second chamber 27 is generated in a center portion of the clearance 29 with respect to the direction of depth, and a flow from the second chamber 27 to the first chamber 26 is generated at either end of the clearance 29 with respect to the direction of depth.

FIGS. 2(a) and 2(b) show symbols of dimensions of the exhaust gas processing devices 16 that were used in the first example and the second example. These dimensions and the experimental conditions are as follows.

The inner height H of the dilution container=300 mm, the width W=170 mm, and the depth d=140 mm.
- the angle θ of the partition plate 28=45°;
- the size C of the clearance=5 mm;
- the distance h from the top plate 25a to the clearance 29=100 mm;
- the inner diameter of the cathode off-gas inlet portion 30 and that of the discharge portion 32 were each 19 mm; the inner diameter of the anode off-gas inlet portion 31 was 8 mm;
- the flow rate of cathode off-gas=$180 \times 10^{-3}$ m$^3$ per minute;
- the hydrogen gauge pressure=100 kPa; and
- the anode purge interval=25 seconds.

The hydrogen gauge pressure refers to the pressure at a section immediately upstream of the purge on-off valve 23.

As shown in FIG. 5, the peak hydrogen concentration in the comparison example was 3.8 to 3.9% every time the anode purge was performed. In contrast, the peak hydrogen concentration in the first example was 1.1 to 1.2%, and that of the second example was approximately 1.7%. That is, the peak hydrogen concentration in the first example was lowered to approximately 30% of the peak value of the comparison example. The peak hydrogen concentration in the second example was lowered to approximately 44% of the peak value of the comparison example. At present, it is believed that the hydrogen concentration in exhaust gas is preferably not higher than 2%, but the comparison example had values almost twice the preferable values. However, in the first and second examples, the peak hydrogen concentration in exhaust gas was kept below 2% even if the anode purge was performed. In the first example, in which anode off-gas flows while spreading over the entire clearance 29, the peak hydrogen concentration was kept even lower than the second example.

The preferred embodiment has the following advantages.

(1) The partition plate 28 divides the exhaust gas processing device 16 into the first chamber 26, into which cathode off-gas is introduced, and the second chamber 27, in to which anode-off gas is introduced. The clearance 29, which connects the first chamber 26 and the second chamber 27 to each other, is provided at the distal end of the partition plate 28. The discharge portion 32 and the cathode off-gas inlet portion 30 are provided in the first chamber 26. The anode off-gas inlet portion 31 is proved in the second chamber 27. Therefore, compared to the prior art, the present embodiment can lower the peak hydrogen concentration in the exhaust gas discharged through the discharge portion 32 to the atmosphere by a simple structure.

That is, since the discharge portion 32 is located in the first chamber 26, anode off-gas is released to the atmosphere through the discharge portion 32 through the first chamber 26. The anode off-gas introduced into the second chamber 27 is expanded and diffused in the second chamber 27. On the other hand, cathode off-gas that is introduced into the first chamber 26 as dilution gas advances toward the clearance 29 while spreading. Part of the cathode off-gas in the first chamber advances to the discharge portion 32 from the clearance 29, and is discharged through the discharge portion 32. Also, part of the cathode off-gas in the first chamber 26 advances to the second chamber 27 from the clearance 29 and changes its direction at the clearance 29. Then, the part of the cathode off-gas returns to the first chamber 26 from the second chamber 27. Having moved to the clearance 29, the anode off-gas in the second chamber 27 is sequentially moved from the second chamber 27 to the first chamber 26 by the action of flow that repeats entry and exit at the clearance 29. That is, in the vicinity of the clearance 29, cathode off-gas and anode off-gas are mixed, and a flow is created that repeats entry and exit between the first chamber 26 and the second chamber 27. After moving to the first chamber 26, anode off-gas is released to the outside of the dilution container 25 through the discharge portion 32. This lowers the peak hydrogen concentration in the exhaust gas discharged to the atmosphere through the discharge portion 32.

(2) The cathode off-gas inlet portion 30 of the first example is configured such that the flow of cathode off-gas introduced into the first chamber 26 is directed to the clearance 29, and that, when no anode off-gas is introduced, cathode off-gas flows while spreading over the entire the clearance 29. Therefore, the flow of cathode off-gas from the first chamber 26 to the second chamber 27 inhibits anode off-gas from directly flowing from the second chamber 27 to the discharge portion 32.

(3) The anode off-gas inlet portion 31 and the cathode off-gas inlet portion 30 are arranged such that the direction in which anode off-gas is introduced is the same as the direction in which cathode off-gas is introduced. The partition plate 28 is arranged to be inclined away from the anode off-gas inlet portion 31. The clearance 29 is formed at a portion of the partition plate 28 that is farthest from the anode off-gas inlet portion 31. Therefore, since anode off-gas that is introduced through the anode off-gas inlet portion 31 to the second chamber 27 is expanded and diffused in the second chamber 27, the anode off-gas is likely to reach the clearance 29 with a relatively lowered hydrogen concentration. Also, cathode off-gas that is introduced into the first chamber 26 through the cathode off-gas inlet portion 30 reaches the clearance 29 while spreading along the partition plate 28. Thereafter, the cathode off-gas is likely to be discharged through the discharge portion 32 after being mixed with gas in the second chamber 27.

(4) The exhaust gas processing device 16 of the first example is configured such that cathode off-gas that is introduced into the first chamber 26 through the cathode off-gas inlet portion 30 flows toward the clearance 29, and that cathode off-gas at the clearance 29 flows while spreading over the entire clearance 29 except when the anode purge is being performed. Therefore, the anode off-gas sequentially moves from the second chamber 27 to the first chamber 26 by the action of the cathode off-gas, which repeats entry and exit between the first chamber 26 and the second chamber 27 in the vicinity of the clearance 29. Accordingly, the anode off-gas in the first chamber 26 is released to the atmosphere through the discharge portion 32. Therefore, compared to the prior art, the present embodiment can lower, to or below the reference value, the hydrogen concentration in the exhaust gas discharged through the discharge portion 32 to the atmosphere by a simple structure.

(5) The cathode off-gas inlet portion 30 is structured such that the flow of cathode off-gas spreads in the direction of width of the partition plate 28 by impinging on the partition plate 28 after being introduced into the first chamber 26. That is, the cathode off-gas inlet portion 30 is structured such that the flow of cathode off-gas introduced into the first chamber 26 impinges on the partition plate 28 so as to be spread in directions that are perpendicular to the introducing direction of the cathode gas and parallel with the partition plate 28. Therefore, the anode off-gas introduced into the second chamber 27 is efficiently moved to the first chamber 26 by the action of the cathode off-gas, and discharged through the discharge portion 32. Since the cathode off-gas impinges on the partition plate 28, the flow velocity of the cathode off-gas is reduced. Thus, the cathode off-gas that flows into the second chamber 27 does not create eddies. Therefore, the anode off-gas is prevented from being carried by eddies in the second chamber 27. That is, the anode off-gas is prevented from approaching the clearance 29 without being diffused in the second chamber 27. In other words, the anode off-gas is sufficiently diffused in the second chamber 27.

(6) The clearance 29 is defined between the wall surface 25b of the dilution container 25 and the distal end of the partition plate 28. Therefore, by changing the angle and length of the partition plate 28, the clearance 29 is easily adjusted to a proper value.

(7) The dilution container 25 is formed as a rectangular parallelepiped. Therefore, the dilution container 25 is easily divided into the first chamber 26 and the second chamber 27 by the partition plate 28. Also, the clearance 29, which is defined by the distal end of the partition plate 28 and the wall surface 25b of the dilution container 25, is easily configured such that air at the clearance 29 flows while spreading over the entire clearance 29 except when the anode purge is being performed.

(8) When anode off-gas is introduced through the anode off-gas inlet portion 31 to the second chamber 27, water is separated from the anode off-gas. The separated water collects at the bottom of the dilution container 25. Likewise, water, or droplets, in the cathode off-gas that is introduced through the cathode off-gas inlet portion 30 to the first chamber 26, are separated, and the separated water collects at the bottom of the dilution container 25. When the dilution container 25 is arranged vertically, water that collects at the bottom of the dilution container 25 does not block the clearance 29. The water is also easy to remove.

(9) The partition plate 28 serves not only as a partition portion that divides the interior of the dilution container 25 into the first chamber 26 and the second chamber 27, but also as a dilution gas conducting portion that conducts cathode off-gas introduced through the cathode off-gas inlet portion 30 to the first chamber 26 to the clearance 29. That is, the partition plate 28 has a gas conducting function. Thus, compared to a structure in which a partition portion and a dilution gas conducting portions are separately provided, the present embodiment has a simple structure.

(10) The partition plate 28 functions as a dilution gas conducting portion that conducts cathode off-gas. When anode off-gas is introduced into the second chamber 27, the partition plate 28 guides the flow of cathode off-gas so that the flow spreads over the entire clearance 29. Therefore, anode off-gas is sequentially moved from the second chamber 27 to the first chamber 26 in a efficient manner, and is released to the outside of the dilution container 25 through the discharge portion 32.

(11) The clearance 29, which serves as a communication portion, is formed like a slit. The longitudinal direction of the clearance 29 extends perpendicular to the direction of flow of cathode off-gas. The partition plate 28 is formed such that, when anode off-gas is not introduced into the second chamber 27, cathode off-gas flows from the cathode off-gas inlet portion 30, while spreading beyond the longitudinal size of the clearance 29. Therefore, although the clearance 29 is thin and long, the partition plate 28, which serves as a dilution gas conducting portion, allows the flow of cathode off-gas to spread over the entire the clearance 29. This efficiently moves anode off-gas from the second chamber 27 to the first chamber 26.

(12) The communication portion that connects the first chamber 26 and the second chamber 27 to each other is formed like a slit. The longitudinal direction of the slit extends perpendicular to the direction of flow of cathode off-gas. Thus, the flow of cathode off-gas in the first chamber 26 readily enters the second chamber 27 in a spread state.

(13) A portion of the wall surface 25b of the dilution container 25 that corresponds to the clearance 29 functions as a flow dividing portion. When impinging on the wall surface 25b, the flow of cathode off-gas is divided into flows to the first chamber 26 and the second chamber 27. Thus, part of the flow of cathode off-gas introduced into the first chamber 26 reliably flows into the second chamber 27.

(14) The wall surface 25b of the dilution container 25 functions as a flow dividing portion that divides the flow of cathode off-gas. This eliminates the necessity for providing a separate member serving as a flow dividing portion.

(15) The anode off-gas inlet portion 31 of the first example is arranged such that anode off-gas is sufficiently mixed with cathode off-gas in the second chamber 27 before passing through the clearance 29. Therefore, anode off-gas that is introduced through the anode off-gas inlet portion 31 to the second chamber 27 is prevented from directly flowing to the clearance 29. Thus, the anode off-gas is sufficiently expanded and diffused in the second chamber 27, so that the anode off-gas readily reaches the clearance 29 at a relatively low hydrogen concentration.

The above described embodiment may be modified as follows.

As shown in FIG. 6(a), the dilution container 25 may be arranged horizontally so that the cathode off-gas inlet portion 30, the anode off-gas inlet portion 31, and the discharge portion 32 extend horizontally, and that the distal end of the partition plate 28 is inclined downward. As shown in FIG. 6(b), the dilution container 25 may be arranged horizontally such that the distal end of the partition plate 28 is inclined upward. That is, the dilution container 25 does not need to be arranged vertically such that the cathode off-gas inlet portion 30, the anode off-gas inlet portion 31, and the discharge portion 32 extend upward, as in the above embodiment.

When the dilution container 25 is arranged horizontally, the arrangement of FIG. 6(b), in which the anode off-gas inlet portion 31 is located at the lowermost position, is preferable to the arrangement of FIG. 6(a), in which the anode off-gas inlet portion 31 is located at the uppermost position. This is because, since the specific gravity of hydrogen is small, hydrogen is likely to remain at a portion of the second chamber 27 that is far from the clearance 29 in the arrangement of FIG. 6(a). For purposes of illustration, the wall on which the cathode off-gas inlet portion 30 and the anode off-gas inlet portion 31 are provided is referred to as the top plate 25a in cases where the dilution container 25 is arranged horizontally.

The dilution container 25 does not need to be arranged such that the distal edge of the partition plate 28 extends horizontally, but may be arranged such that the distal edge of the partition plate 28 extends vertically. In the vertical arrangements of FIGS. 2(a) and 3(a) and the horizontal arrangements of FIGS. 6(a) and 6(b), the distal edge of the partition plate 28 extends horizontally.

As shown in FIG. 7(a), the cathode off-gas inlet portion 30, the anode off-gas inlet portion 31, and the discharge portion 32 may be arranged zigzag on the top plate 25a. Also, as shown in FIG. 7(b), the cathode off-gas inlet portion 30, the anode off-gas inlet portion 31, and the discharge portion 32 may be linearly arranged on a diagonal line of the top plate 25a. That is, the cathode off-gas inlet portion 30, the anode off-gas inlet portion 31, and the discharge portion 32 do not need to be linearly arranged along the widthwise direction on the top plate 25a on the top plate 25a.

Figure 8A:
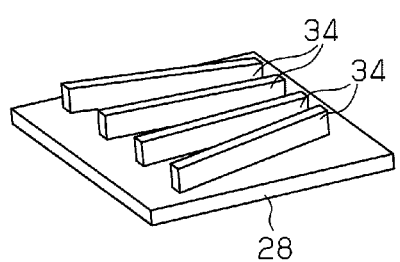
FIG. 8(a) is a schematic perspective view showing a partition plate of a modification.

As shown in FIG. 8(a), a plurality of protrusions, or ribs 34, may be provided on the partition plate 28, which serves as a conducting portion. The interval between the ribs 34 gradually increases from the proximal end to the distal end of the partition plate 28. The ribs 34 allows cathode off-gas introduced into the first chamber 26 through the cathode off-gas inlet portion 30 to readily spread over the entire width of the clearance 29.

Figure 8B:
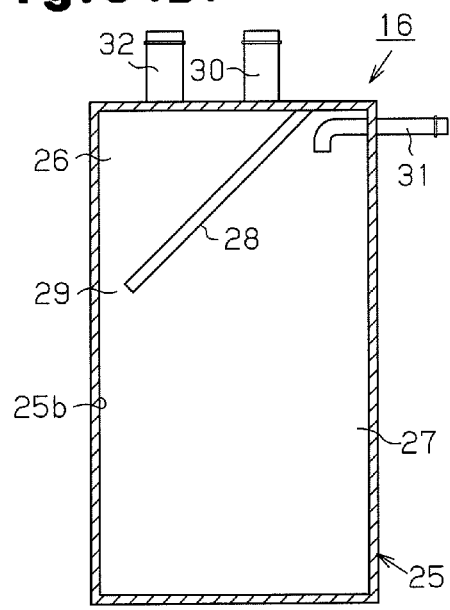
FIG. 8(b) is a schematic cross-sectional view showing an anode off-gas inlet portion of a modification.

As shown in FIG. 8(b), the anode off-gas inlet portion 31 may be arranged to extend through a side wall of the dilution container 25. The anode off-gas inlet portion 31 is formed by an L-shaped pipe. In this case, anode off-gas is expanded and diffused in the second chamber 27 substantially in the same manner as in the above embodiment. That is, the anode off-gas inlet portion 31 does not need to be provided on the top plate 25a. The anode off-gas inlet portion 31 may be provided to extend through a front wall or a back wall of the dilution container 25. The front and back walls of the dilution container 25 are walls that are not the top plate 25a or the bottom wall 25c of the dilution container 25, and are perpendicular to the wall surface 25b.

The cathode off-gas inlet portion 30 and the discharge portion 32 do not need to be arranged on the top plate 25a, but may be arranged to extend through the front wall or the back wall of the dilution container 25, and may be formed by L-shaped pipes.

The height, width, and depth of the dilution container 25, the angle θ of the partition plate 28, the inner diameters of the cathode off-gas inlet portion 30, the anode off-gas inlet portion 31 and the discharge portion 32, and the size of the clearance 29 are not limited to the measurements used in the examples, but may be changed as necessary. For example, the dilution container 25 may be longer or wider than those of the examples. Also, without changing the measurements of the dilution container 25, the angle θ of the partition plate 28 and the distance h from the top plate 25a to the clearance 29 may be changed. The inner diameters of the cathode off-gas inlet portion 30 and the anode off-gas inlet portion 31 may be greater or smaller than those in the examples. Also, the size of the clearance 29 may be greater or smaller than that in the examples.

The shape of the dilution container 25 is not limited to a rectangular parallelepiped having a rectangular cross section. For example, the cross section of the dilution container 25 may be a trapezoid. Instead of a rectangular parallelepiped, the dilution container 25 may have a circular cross section or an elliptic cross section. The partition plate 28 does not need to be a flat plate, but may be a curved plate. Further, the partition plate 28 may have a bent portion. When changing the measurements or shapes of the dilution container 25 and the partition plate 28, the measurements or shapes are determined in advance through the tuft method such that a flow that repeats entry and exit at the clearance 29 is generated. This generates a flow that spreads over the entire clearance 29. That is, the peak hydrogen concentration in the exhaust gas discharged to the atmosphere through the discharge portion 32 can be lowered.

The clearance 29, which is provided at the distal end of the partition plate 28, does not need to be defined between the partition plate 28 and the wall surface 25b. Protrusions or brackets that extend parallel with the distal end of the partition plate 28 may be provided on the wall surface 25b. A clearance 29 may be defined between the distal end of the partition plate 28 and each of the protrusions and brackets.

Figure 9:
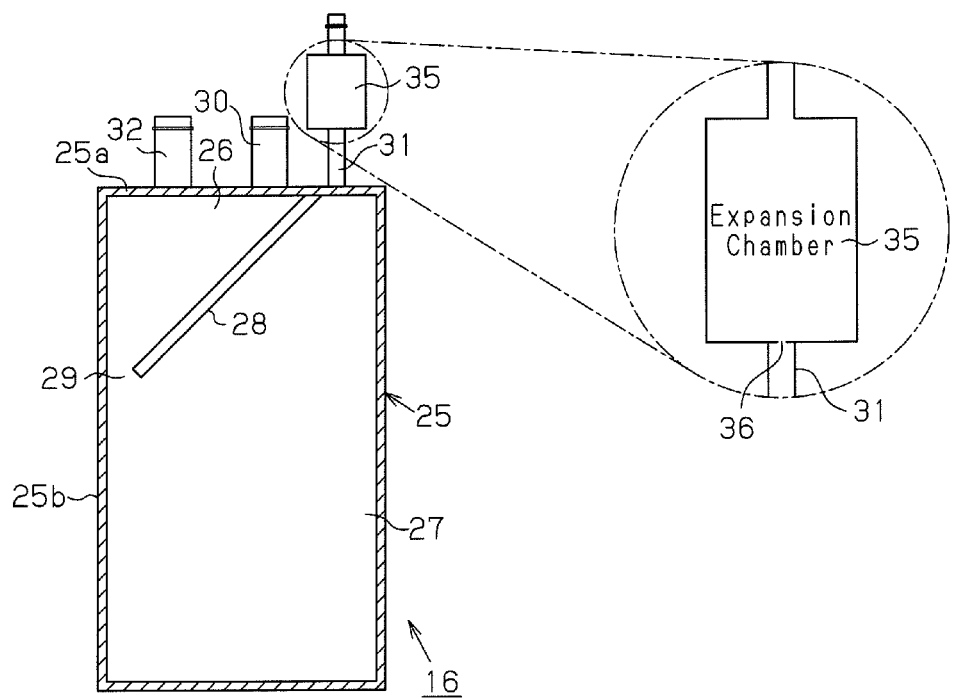
FIG. 9 is a schematic diagram showing an anode off-gas inlet portion of a modification.

As shown in FIG. 9, the anode off-gas inlet portion 31 may have an expansion chamber 35 and an orifice 36. In this case, anode purge gas through the purge gas pipe 22 is introduced into the second chamber 27 at a pressure lower than the case where the expansion chamber 35 and the orifice 36 are not provided. Therefore, anode off-gas introduced into the second chamber 27 is unlikely to approach the clearance 29 without being sufficiently diffused. That is, the anode off-gas in the second chamber 27 is likely to be diffused when approaching the clearance 29. In this manner, the anode off-gas inlet portion 31 does not need to be formed simply by a pipe.

As shown in FIG. 10(a), the pipe forming the anode off-gas inlet portion 31 may extend in a straight line into the second chamber 27. Also, as shown FIG. 10(b), the pipe forming the anode off-gas inlet portion 31 may have a plurality of holes 31a, the diameter of which is less than the inner diameter of the pipe.

As shown in FIG. 11, the distal end of the pipe forming the cathode off-gas inlet portion 30 may be formed as a flat connecting portion that extends along the direction of the depth of the dilution container 25. In this case, cathode off-gas introduced into the first chamber 26 through the cathode off-gas inlet portion 30 readily flows while spreading over the entire clearance 29. That is, the cross-sectional shape of the cathode off-gas inlet portion 30 does not need to be circular, but may be like a slit.

Figure 12A:
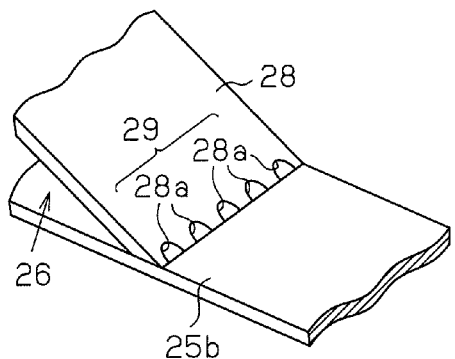
FIGS. 12(a) and 12(b) are partially enlarged perspective views each showing a clearance formed in a partition plate of a modification.
Figure 12B:
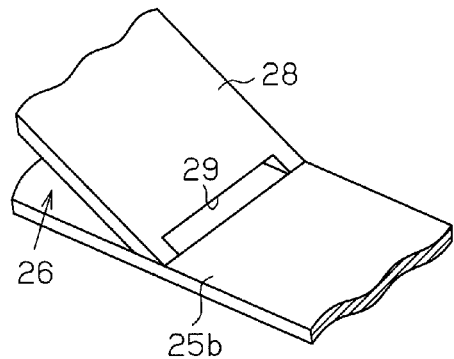

As shown in FIG. 12(a), a plurality of holes 28a may be formed at the distal end of the partition plate 28. These holes 28a form the clearance 29 defined between the wall surface 25b of the dilution container 25 and the distal end of the partition plate 28. The distal end of the partition plate 28 contacts the wall surface 25b. Alternatively, as shown in FIG. 12(b), a slit-like clearance 29 that is shorter than the entire width of the partition plate 28 may be formed in the distal portion of the partition plate 28. That is, the clearance 29 does not need to extend like a slit over the entire width of the partition plate 28.

Figure 13A:
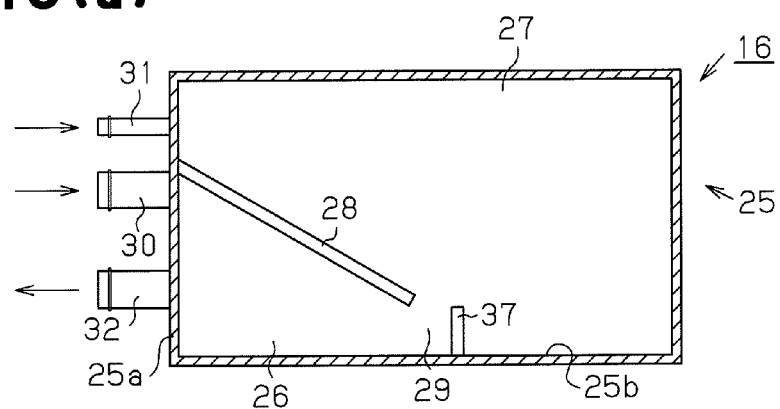
FIGS. 13(a) and 13(b) are cross-sectional side views each showing a partition plate of a modification.

As shown in FIG. 13(a), a baffle plate 37 may be provided at a position that is further into the second chamber 27 than the clearance 29, which is defined between wall surface 25b of the dilution container 25 and the distal end of the partition plate 28. The baffle plate 37 is formed, for example, perpendicular to the wall surface 25b.

Figure 13B:
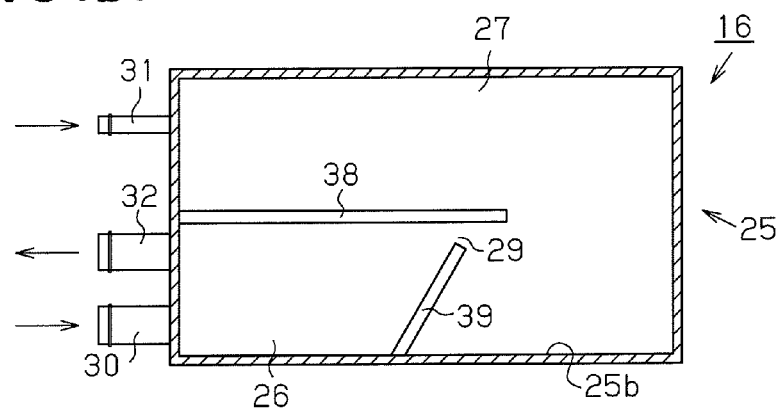

As shown in FIG. 13(b), a partition portion 38 may be arranged such that the direction in which anode off-gas is introduced into the dilution container 25 through the anode off-gas inlet portion 31 is the same as the direction in which cathode off-gas is introduced into the dilution container 25 through the cathode off-gas inlet portion 30 into the dilution container 25. The partition portion 38 is located in the center portion of the top plate 25a. The cathode off-gas inlet portion 30 is arranged such that the distance between the cathode off-gas inlet portion 30 and the partition portion 38 is greater than the distance between the discharge portion 32 and the partition portion 38. A conducting portion 39 is provided at a portion of the wall surface 25b that is closer to the cathode off-gas inlet portion 30 in relation to the partition portion 38. The conducting portion 39 is inclined such that the flow of cathode off-gas from the cathode off-gas inlet portion 30 is directed from the proximal end to the distal end of the partition portion 38. In this case, cathode off-gas introduced into the first chamber 26 from the cathode off-gas inlet portion 30 impinges on the conducting portion 39 and is thus guided to the clearance 29.

The interval of the opening of the purge on-off valve 23 does not need to be set in advance. It may be configured that the controller 24 determines the state of electricity generation of the fuel cell 12, and opens the purge on-off valve 23 when the generating efficiency is lowered.

The fuel cell system 11 may include a hydrogen circuit that is capable of returning hydrogen that has not been used by the fuel cell 12 to the conduit 17, which serves as a hydrogen supply path. For example, the hydrogen circuit connects a portion of the purge gas pipe 22 that is upstream of the purge on-off valve 23 to the conduit 17. A hydrogen circulation pump 5 is provided in the hydrogen circuit. The fuel cell 12 cannot cause 100% of hydrogen to react. However, by recirculating unreacted hydrogen, the hydrogen utilization is increased.

The fuel cell system 11 does not necessarily need to be mounted on a movable body such as a vehicle, but may be installed in an electrical product requiring an electric power supply, or in a stationary fuel cell system.

The hydrogen source of the fuel cell system 11 is not limited to the hydrogen tank 13, which is simply filled with highly pressurized hydrogen gas. For example, the hydrogen source of the fuel cell system 11 may be a hydrogen tank having a hydrogen storage alloy, or a hydrogen source in which a hydrogenated product is reacted to generated hydrogen. The hydrogen source of the fuel cell system 11 may be configured to use reformed gas obtained by reforming fuel such as methanol, natural gas, and gasoline.

The discharge portion 32 does no need to be connected to a muffler.

In the illustrated embodiment, anode off-gas is diluted with cathode off-gas. However, the dilution gas does not need to be cathode off-gas, but may be air supplied from the compressor 14.

Figure 14:
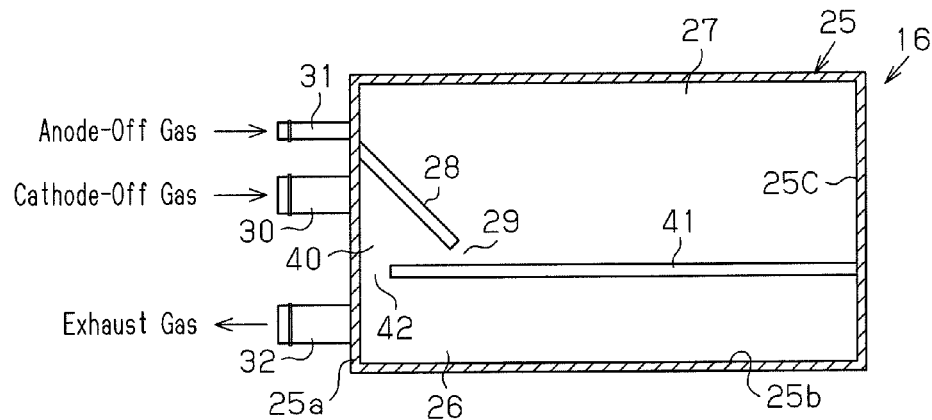
FIG. 14 is a diagram showing a partition plate of a modification.
Figure 15:
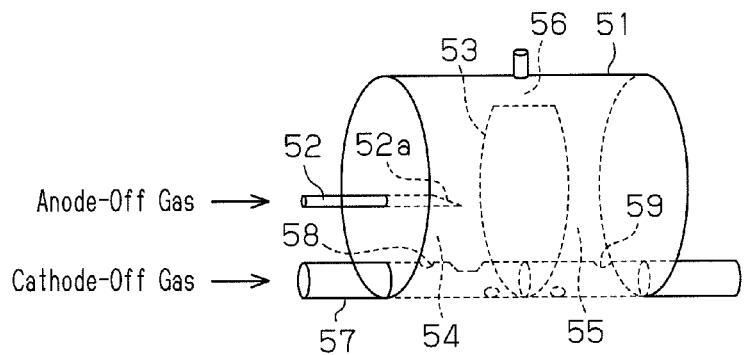
FIG. 15 is a schematic perspective view showing a prior art exhaust gas processing device.
Figure 16:
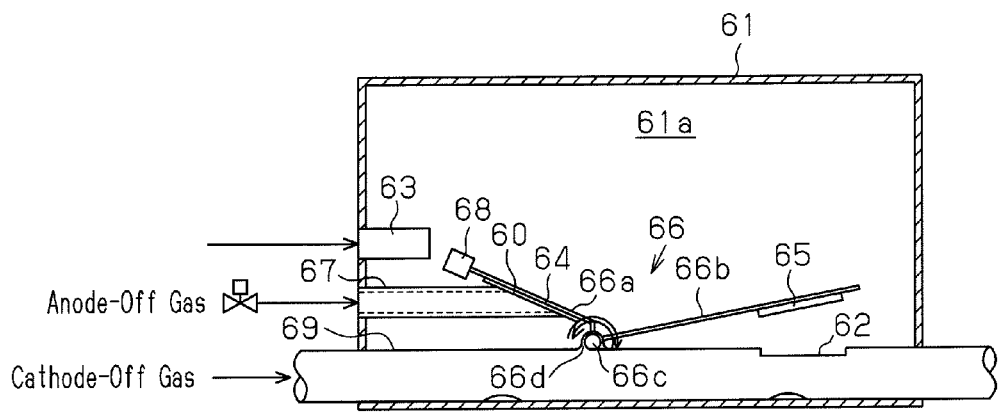
FIG. 16 is a cross-sectional side view illustrating another prior art exhaust gas processing device.

As shown in FIG. 14, the interior of the dilution container 25 may be divided into a first chamber 26, a second chamber 27, and a third chamber 40. That is, the interior of the dilution container 25 may be divided into three or more chambers. The discharge portion 32 is connected to the first chamber 26. The anode off-gas inlet portion 31 is connected to the second chamber 27. The cathode off-gas inlet portion 30 is connected to the third chamber 40. The third chamber 40 is located between the first chamber 26 and the second chamber 27. The first chamber 26 is separate from the second chamber 27.

The dilution container 25 has the partition plate 28 and a second partition plate 41. The second partition plate 41 extends in a straight line from the bottom wall 25c of the dilution container 25 toward the top plate 25a. The proximal end of the partition plate 28 is located in the vicinity of the cathode off-gas inlet portion 30, and the partition plate 28 is inclined away from the anode off-gas inlet portion 31. A clearance 29, which functions as a first communication portion, is defined between the distal end of the partition plate 28 and the second partition plate 41. The clearance 29 connects the second chamber 27 and the third chamber 40 to each other. A second clearance 42, which functions as a second communication portion, is defied between the distal end of the second partition plate 41 and the dilution container 25. The second clearance 42 connects the first chamber 26 and the third chamber 40 to each other.

In the case of FIG. 14 also, when anode off-gas is not introduced into the second chamber 27, a flow of cathode off-gas from the third chamber 40 to the second chamber 27 is generated. Thus, anode off-gas is prevented from rapidly flowing into the discharge portion 32 before being diffused. Anode off-gas and cathode off-gas in the third chamber 40 reaches the first chamber 26 through the second clearance 42, and is then discharged through the discharge portion 32. That is, the exhaust gas processing device 16 lowers the peak hydrogen concentration in the exhaust gas discharged to the atmosphere through the discharge portion 32. Since the second chamber 27, into which anode off-gas is introduced, is different from the first chamber 26, to which the discharge portion 32 is connected, anode gas is inhibited from directly flowing into the discharge portion 32 after being introduced into the dilution container 25.

The third chamber 40 may be identical with the first chamber 26. That is, the dilution container 25 of FIG. 2(a) is configured such that the first chamber 26 also functions as the third chamber 40. The second chamber 27 may be changed as long as it includes at least one chamber to which the anode off-gas inlet portion 31 is connected.

The structure that intermittently introduces anode off-gas into the dilution container 25 is not limited to opening and closing of the purge on-off valve 23. For example, the opening degree of the purge on-off valve 23 may be adjustable, and the purge on-off valve 23 may be opened and closed in a stepless manner. Further, instead of being completely closed, the purge on-off valve 23 may be slightly open to such a degree that the concentration of exhaust gas is within a permissible level.

The invention claimed is:

1. An exhaust gas processing device for t fuel cell, wherein anode off-gas is intermittently introduced to the exhaust gas processing device, the exhaust gas processing device dilutes the anode off-gas with dilution gas and discharges the anode off-gas, the device comprising:
   a dilution container;
   a partition plate that divides the interior of the dilution container into a first chamber and at second chamber, the partition plate having a clearance for connecting the first chamber to the second chamber;
   a discharge portion provided in the first chamber;
   a dilution gas inlet portion provided in the first chamber; and
   an anode off-gas inlet portion provided in the second chamber,
   wherein the dilution gas inlet portion is configured such that:
   dilution gas that is introduced into the first chamber flows toward the clearance; and
   when anode off-gas is not introduced into the second chamber, the dilution gas flows while spreading over the entire clearance,
   wherein the anode off-gas inlet portion and the dilution gas inlet portion are arranged such that the direction in which the anode off-gas is introduced is the same as the direction in which the dilution gas is introduced,
   wherein the partition plate is arranged to be inclined away from the anode off-gas inlet portion,
   wherein the clearance is formed at a portion of the partition plate that is farthest from the anode off-gas inlet portion, and
   wherein the discharge portion and the dilution gas inlet portion are not coaxially aligned and the respective flows are in opposite directions.

2. The exhaust gas processing device according to claim 1, wherein the dilution container has a wall surface, and
   wherein the clearance is defined between the wall surface of the dilution container and a distal end of the partition plate.

3. The exhaust gas processing device according to claim 1, wherein the dilution container is formed as a rectangular parallelepiped.

4. An exhaust gas processing device for a fuel cell, wherein anode off-gas is intermittently introduced to the exhaust gas processing device, the exhaust gas processing device dilutes the anode off-gas with dilution gas and discharges the anode off-gas, the device comprising:
   a dilution container;
   a partition plate that divides the interior of the dilution container into a first chamber and a second chamber, the partition plate having a clearance for connecting the first chamber to the second chamber;
   a discharge portion provided in the first chamber;
   a dilution gas inlet portion provided in the first chamber; and
   an anode off-gas inlet portion provided in the second chamber,
   wherein the dilution gas inlet portion is configured such that:
   dilution gas that is introduced into the first chamber flows toward the clearance; and
   when anode off-gas is not introduced into the second chamber, the dilution gas flows while spreading over the entire clearance,
   wherein the dilution gas inlet portion defines the introducing direction of the dilution gas,
   wherein the dilution gas inlet portion is configured such that, when a flow of the dilution gas introduced into the first chamber impinges on the partition plate, the flow spreads in a direction that is perpendicular to the introducing direction and parallel with the partition plate, and
   wherein the discharge portion and the gas inlet portion are not coaxially aligned and the respective flows are in opposite directions.

5. An exhaust gas processing device for a fuel cell, wherein anode off-gas is intermittently introduced to the exhaust gas processing device, the exhaust gas processing device dilutes the anode off-gas with dilution gas and discharges the anode off-gas, the device comprising:
   a dilution container;
   a partition plate that divides the interior of the dilution container into a first chamber and a second chamber, the partition plate having a clearance for connecting the first chamber to the second chamber;
   a discharge portion provided in the first chamber;
   a dilution gas inlet portion provided in the first chamber; and
   an anode off-gas inlet portion provided in the second chamber,
   wherein the dilution gas inlet portion is configured such that:
   dilution gas that is introduced into the first chamber flows toward the clearance; and
   when anode off-gas is not introduced into the second chamber, the dilution gas flows while spreading over the entire clearance,
   wherein the anode off-gas inlet portion and the dilution gas inlet portion are arranged such that the direction in which the anode off-gas is introduced is the same as the direction in which the dilution gas is introduced,
   wherein the partition plate is arranged to be inclined away from the anode off-gas inlet portion,
   wherein the clearance is formed at a portion of the partition plate that is farthest from the anode off-gas inlet portion, and
   wherein the partition plate has a first surface and a second opposing surface, the first surface is impinged by the dilution gas in the first chamber and the second surface is disposed in the second chamber.

6. An exhaust gas processing device for a fuel cell, wherein anode off-gas is intermittently introduced to the exhaust gas processing device, the exhaust gas processing device dilutes the anode off-gas with dilution gas and discharges the anode off-gas, the device comprising;
   a dilution container;
   a partition plate that divides the interior of the dilution container into a first chamber and a second chamber, the partition plate having a clearance for connecting the first chamber to the second chamber;
   a discharge portion provided in the first chamber;
   a dilution gas inlet portion provided in the first chamber; and
   an anode off-gas inlet portion provided in the second chamber,
   wherein the dilution gas inlet portion is configured such that:
   dilution gas that is introduced into the first chamber flows toward the clearance; and
   when anode off-gas is not introduced into the second chamber, the dilution gas flows while spreading over the entire clearance,
   wherein the dilution gas inlet portion defines the introducing direction of the dilution gas, wherein the dilution gas inlet portion is configured such that, when a flow of the dilution gas introduced into the first chamber impinges on the partition plate, the flow spreads in a direction that is perpendicular to the introducing direction and parallel with the partition plate, and
wherein the partition plate has a first surface and to second opposing surface, the first surface is impinged by the dilution gas in the first chamber and the second surface is disposed in the second chamber.

* * * * *